US012257803B2

(12) United States Patent
Berns et al.

(10) Patent No.: US 12,257,803 B2
(45) Date of Patent: Mar. 25, 2025

(54) METHOD AND APPARATUS FOR MAKING INSULATING PANELS

(71) Applicant: SIEMPELKAMP MASCHINEN-UND AN-LAGENBAU GMBH, Krefeld (DE)

(72) Inventors: Jochem Berns, Grefrath (DE); Klaus-Peter Schletz, Krefeld (DE); Jochen Dauter, Krefeld (DE)

(73) Assignee: SIEMPELKAMP MASCHINEN-UND ANLAGENBAU GMBH, Krefeld (DE)

( * ) Notice: Subject to any disclaimer, the term of this patent is extended or adjusted under 35 U.S.C. 154(b) by 315 days.

(21) Appl. No.: 17/419,969

(22) PCT Filed: Jan. 17, 2020

(86) PCT No.: PCT/EP2020/051151
§ 371 (c)(1),
(2) Date: Jul. 9, 2021

(87) PCT Pub. No.: WO2020/156837
PCT Pub. Date: Aug. 6, 2020

(65) Prior Publication Data

US 2022/0072822 A1 Mar. 10, 2022

(30) Foreign Application Priority Data

Feb. 2, 2019 (DE) ............................ 102019000767

(51) Int. Cl.
*B30B 5/06* (2006.01)
*B27N 1/00* (2006.01)
(Continued)

(52) U.S. Cl.
CPC ................ *B30B 15/34* (2013.01); *B27N 1/00* (2013.01); *B27N 3/18* (2013.01); *B27N 3/24* (2013.01); *B30B 5/06* (2013.01)

(58) Field of Classification Search
CPC ........................................................ B30B 5/06
See application file for complete search history.

(56) References Cited

U.S. PATENT DOCUMENTS

| | | | | |
|---|---|---|---|---|
| 2,071,999 A * | 2/1937 | Williams | B30B 5/06 | 144/242.1 |
| 2,459,295 A * | 1/1949 | Skoog | B30B 5/06 | 100/211 |
| 2,720,231 A * | 10/1955 | Hessler | B30B 5/06 | 198/837 |

(Continued)

FOREIGN PATENT DOCUMENTS

| | | |
|---|---|---|
| DE | 4316901 A | 12/1993 |
| DE | 102007044161 A | 3/2009 |

(Continued)

*Primary Examiner* — Andrew D Graham
(74) *Attorney, Agent, or Firm* — Andrew Wilford

(57) ABSTRACT

The invention relates to a device and a method having a first and a second zone (Z1, Z2) for producing insulating or acoustic panels from a pressed material mat (2) which consists at least partially of lignocellulose particles coated with binders, the first zone (Z1) being designed for heating and/or compressing the pressed material mat, and the second zone (Z2) being designed for curing the pressed material mat with the aid of calibration plates (3), and there being driven circulating screen bands (5*a*-5*f*) in contact with the upper and lower pressed material mat surfaces. According to the invention, to increase the production speed, at least four circulating screen bands (5*a*-5*f*) are used, at least two of which are in operative contact with the pressed material mat (2) in the region of the first zone (Z1), and at least two of which are in operative contact with the pressed material mat (2) in the region of the second zone (Z2).

12 Claims, 2 Drawing Sheets

(51) Int. Cl.

| | |
|---|---|
| ***B27N 3/18*** | (2006.01) |
| ***B27N 3/24*** | (2006.01) |
| ***B30B 15/34*** | (2006.01) |

(56) References Cited

U.S. PATENT DOCUMENTS

| | | | | |
|---|---|---|---|---|
| 3,325,859 | A * | 6/1967 | Goldstein | B30B 5/06 425/371 |
| 3,521,552 | A * | 7/1970 | Knapp | B30B 5/06 100/154 |
| 3,671,365 | A * | 6/1972 | Cover, Jr. et al. | B30B 5/06 162/301 |
| 3,723,230 | A * | 3/1973 | Troutner | B27D 3/04 100/153 |
| 3,850,213 | A * | 11/1974 | Keaton | B30B 1/261 100/154 |
| 3,945,789 | A * | 3/1976 | Boman | B30B 5/06 425/371 |
| 4,015,921 | A * | 4/1977 | De Mets | B30B 5/06 425/371 |
| 5,433,905 | A * | 7/1995 | Tisch | B30B 15/308 425/371 |
| 6,142,068 | A * | 11/2000 | Sebastian | B27N 3/24 425/371 |
| 11,180,272 | B2 * | 11/2021 | Gabrielli | B65B 11/50 |
| 2002/0192548 | A1 * | 12/2002 | Schaefer | H01M 8/1004 429/510 |
| 2016/0151940 | A1 * | 6/2016 | Kang | B29C 70/506 425/329 |

FOREIGN PATENT DOCUMENTS

| | | |
|---|---|---|
| DE | 102008039720 A | 3/2010 |
| DE | 102008057557 A | 5/2010 |

* cited by examiner

METHOD AND APPARATUS FOR MAKING INSULATING PANELS

CROSS REFERENCE TO RELATED APPLICATIONS

This application is the US-national stage of PCT application PCT/EP2020/051151 filed 17 Jan. 2020 and claiming the priority of German patent application 102019000767 itself filed 2 Feb. 2019.

The invention relates to an apparatus having an upstream and a downstream zone for making insulating or soundproofing panels from a pressed-material mat consisting at least partially of lignocellulosic particles wetted with a binder, the upstream zone serving for heating and/or compressing the pressed-material mat and the downstream zone for hardening the pressed-material mat with the aid of calibration plates, driven endless mesh belts being provided in contact with the upper and the lower mat faces.

The invention further relates to a method of making insulating or soundproofing panels from a pressed-material mat consisting at least partially of lignocellulosic particles wetted with a binder with this apparatus.

Such an apparatus has been disclosed, for example, in DE 10 2008 039 720. In some cases, such an apparatus is connected in series with an upstream precompacting device or downstream press, for example a continuous presses, which is not of importance within the scope of the invention. The products produced on the apparatus are marketed, for example, by the company SOPREMA GmbH under the trade name Pavatex or the company H. Henselmann GmbH+ Co KG under the trade name Gutex. Suitable binders are, for example, those working by polycondensation or polyaddition such as, for example, PMDI.

Within the scope of the invention, insulating panels preferably with densities of 100-240 kg/m$^2$ are to be manufactured. The mesh belts or short mesh belts serve to guide the mat of pressed material at a desired speed through the apparatus by being driven at the this desired transport speed of the mat. Steam can be drawn from outside through the mesh belts into the pressed-material mat or liquid and air can be extracted.

In such an apparatus, it has been found that the meshes, which consist of plastic or wire screening, are stretched beyond their nominal tensile load limits when a certain drive power is exceeded. This inevitably leads to limited productivity (current limitation approximately 8 t/h for a 60 mm thick pressed-material mat), since, if the foraminous belts have a maximum tensile strength, this results in a length limitation of the curing distance that is dependent on the product density. The required curing time of the binder determines the achievable speed with the maximum length of the curing zone.

On the other hand, the production speed should, however, be increased to increase production, which is thus the object of the invention.

With regard to the apparatus, this object is achieved by the features of claim 1 and in particular in that at least four separate endless mesh belts of which at least two operatively engage the pressed-material mat in the upstream zone and of which at least two operatively engage the pressed-material mat in the downstream zone.

In this case, the term "operatively engage is also to be understood as meaning an outer endless porous belt between an inner pressed-material mat and the mesh belt. Thus, for two zones, separate mesh belt systems have been used in a press-material mat width. In each zone, at least one upper mesh belt is above the mat of pressed material and one lower mesh belt is below the mat of pressed material. The inventors have recognized that loading on the mesh belt in compression or of the steam heating, that is to say approximately in the upstream third of the overall apparatus, is particularly large. For this reason, a separate mesh belt is used for the upstream zone on each face of the pressed-material mat, which mesh belts can be driven independently of the mesh belts used in the curing region, that is to say the downstream zone. This ensures that the resulting tensile forces are taken up by two belt systems. If a total of at least four separate mesh belts are used for the input drive power, significantly higher speeds of the belts and pressed-material mat than previously deemed possible are possible. Calculations and experiments have shown that with such an apparatus at least 15 t/h of the desired insulating panels can be produced. The capacity can thus be considerably increased if friction forces of the mesh belts acting on the conveyor belts at the top and bottom are distributed over a plurality of belt loops so that with the available mesh belts, one can in effect make a longer apparatus for making of insulating panels.

In this case, it is preferred if each of the at least four mesh belts has its own drive.

Each mesh belt can thus be operated up to its nominal maxim load. The tensile stress on the mesh belts can be detected by suitable sensors and the results thereof can be fed to the drive controller. Thus, the drive torques can be held in a permissible range. As a rule, driven rollers are provided for advancing the mesh belts.

It is also advantageous if a device for applying steam to the mat of pressed material is provided in the upstream zone and a device for air cooling the mat of pressed material is provided at the downstream end of the downstream zone.

The higher speed achievable with the invention allows higher productivity with slightly higher energy input or slightly increased apparatus length. The necessary energy for curing the pressed-material mat and its binder is thus made available. The steam is pressurized such that it penetrates at least as far as the center of the mat of pressed material and heats the latter. It may A steam-air mixture whose dew point is also set can be used. At least some of the moist air is preferably aspirated again on the opposite side of the pressed-material mat or a vacuum is generated by suction in order to control the penetration depth of the steam into the pressed-material mat and to reduce the curing time in the downstream zone. In this case, it is advantageous if there are at least two steaming stations in the upstream zone, in which one saturates the pressed-material mat with steam above, and the other saturates the pressed-material mat with steam from below. The upstream zone, which is referred to below as the "steam zone" in order to simplify readability in the description, is generally somewhat shorter than the downstream zone, which is referred to as the "curing zone."

Finally, air cooling serves to cool the cured pressed-material mat to such an extent that, after emerging from the apparatus, no harmful processes, such as for example hydrolysis, can occur that impair panel quality.

The apparatus preferably has a height-adjustable intake opening.

The necessary drive power for the pressed-material mat is significantly dependent on the thickness of the pressed-material mat and its compression. Since customers wish to change their production temporarily and the product thicknesses preferably vary between 5 and 240 mm, an adjustment may be necessary in order to bring about additional compaction or to adjust the spacing between the mesh belt on the upper face of the pressed-material mat and the mesh belt bearing on the lower face of the pressed-material mat.

Advantageously, provision is made for a steam device to be arranged in the intake opening.

By steaming the mat right at mouth of the intake opening, frictional forces arising during the transport of the mat are already greatly reduced because the pressed-material mat becomes softer.

The calibration plates are preferably heatable.

The calibration plates 3, which can be heated via different systems, are therefore arranged in the zones and preferably in zone 2. Here, for example, passages traversed by heating fluid, inductive heaters, electric heating or steam heaters are suitable, the latter also being able to deliver steam directly to the pressed-material mat. As a result, the curing process of the binder can be accelerated, so that the length of the apparatus is kept within acceptable limits.

Preferably, the upstream and downstream zones are immediately adjacent each other.

In this connection, directly means that, in the running direction of the pressed-material mat between the last mesh-belt deflection roller of the evaporation zone and the upstream mesh-belt deflection roller of the curing zone there is a maximum spacing of 0.2 m. As a result, loss of energy to the environment of the heat necessary for curing is avoided in the apparatus.

It is of particular advantage if a slide shoe bridges the gap between two mesh-belt deflection rollers and the pressed-material mat or a mesh belt between two mesh-belt deflection rollers.

If a mat of pressed material is guided through the gap between two mesh-belt deflection rollers, there is the risk that the compressed-material mat expands and causes damage in the transition from the steam zone to the curing zone or even ruptures. This is critical in particular in the transition region from the upstream to the downstream zone and can therefore be expected there because there is no support in this region, for example by a calibration plate. In order to prevent expansion of the mat and thus damage, a slide shoe that extends over the full width of the pressed-material mat is between the mesh-belt deflection rollers. In direct contact with the pressed-material mat, the latter is then fed over the maximum 0.2 m long transition on the shoe face. The slide shoe has a flat sliding face facing the pressed-material mat and its side walls are shaped in such a way that they conform to the shapes of the deflection. The cross-section can be, for example, triangular, with a hypotenuse (sliding side) being straight and the legs of the shape of the deflection rollers being arcuate.

With regard to the method, the object of the invention is achieved by the features of claim 8 and in particular in that at least four endless mesh belts are used, of which at least two act on the pressed-material mat in the upstream zone and of which at least two act on the pressed-material mat in the downstream zone.

Further method claims correspond to the apparatus claims and utilize these advantages.

In the following, the invention is described in more detail with reference to a drawing showing several embodiments. Therein:

SPECIFIC DESCRIPTION

Figure 1:
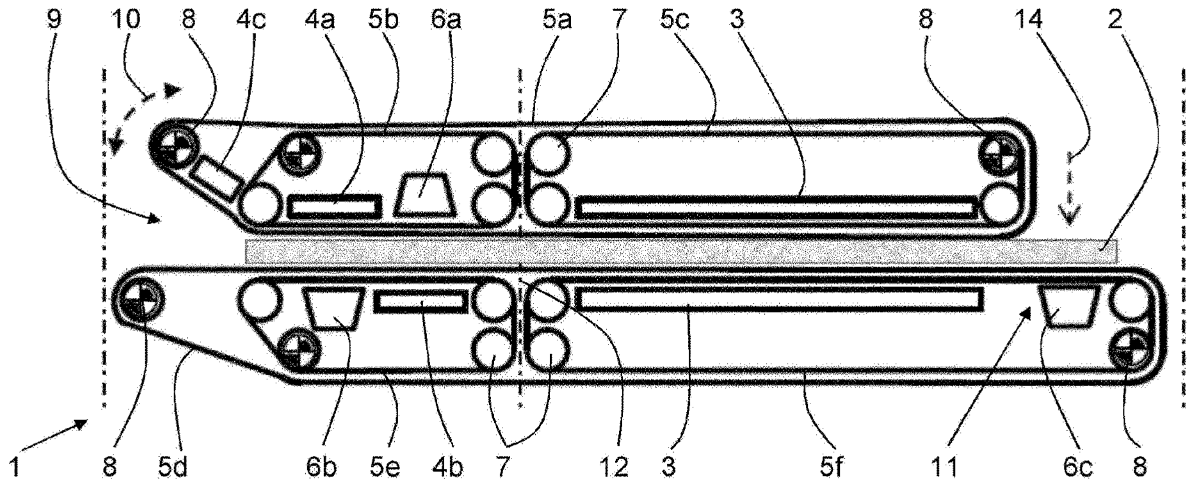
FIG. 1 is a schematic view of a first embodiment of the invention.

FIG. 1 is a schematic side view of the apparatus according to the invention for making insulating panels. A pressed-material mat consisting at least partially of lignocellulosic particles wetted with a binder is treated between an upper circulating mesh belt 5*a* and a lower circulating mesh belt 5*d* in an upstream zone Z1 and a downstream zone Z2. The separation of the zones is indicated in all figures by a dot-dash vertical line.

In the past, the pressed-material mat has been heated between a single upper and a single lower mesh belt reach of the belts with steam or a steam/air mixture and is then cured by application of heat via calibration plates. Production speeds were limited by the tensile strengths of the meshes.

FIG. 1 shows however that two further endless mesh belts are within the endless upper mesh belt 5*a* and the endless lower mesh belt 5*d*. In the upper part of the apparatus, they are shown at 5*b* and 5*c*, and in the lower part of the apparatus at 5*e* and 5*f*. Each of the rotating mesh belts 5*a*-5*f* has its own drive formed by a respective driven deflection roller 8.

In the upstream part of the apparatus at an intake opening 9 the pressed-material mat 2 resists compression until softened by treatment by steamers 4*a* and 4*b* so that most of the friction that the drive has to overcome is generated there. According to the invention, this zone Z1 holds two separate rotating mesh belts each with its own drive. As a result, the tensile load on the long endless mesh belts 5*a* and 5*d* decreases. The same applies to zone Z2 where the pressed-material mat 2 is hardened. Here too, separate circulating and driven mesh belts 5*c*, 5*f* are provided above and below the pressed-material mat 2 for assisting in transport. Overall, considerably higher speeds can be achieved with this arrangement.

The devices 4*a* and 4*b* for applying steam are provided in zone 1, that is to say within the endless mesh belts 5*b* and 5*e*. Thus steam penetrates through the rotating mesh belts 5*a* and 5*b* or 5*d* and 5*e* into the pressed-material mat 2 and condenses. Residual steam and residual air emerging can be aspirated and discharged by suction devices 6*a* and 6*b*.

A further device for applying steam 4*c* can be provided, for example, at the intake opening 9. The moist face produced thus reduces friction on the mesh belts 5*a* and 5*d*, which leads to additional energy savings.

High-efficiency calibration plates 3, which can be heated via different systems, are provided in zone 2. For example, passages traversed by heating fluid, inductive heaters, electric heating are used here or steam heaters, the latter also being able to deliver the steam directly to the mat of pressed material even in the hardening zone.

At the outlet of the apparatus, the pressed-material mat is cooled by a suction device 6*c* that pulls cool air 14 from the environment through the pressed-material mat 2 at an air-cooling station 11.

Figure 2:
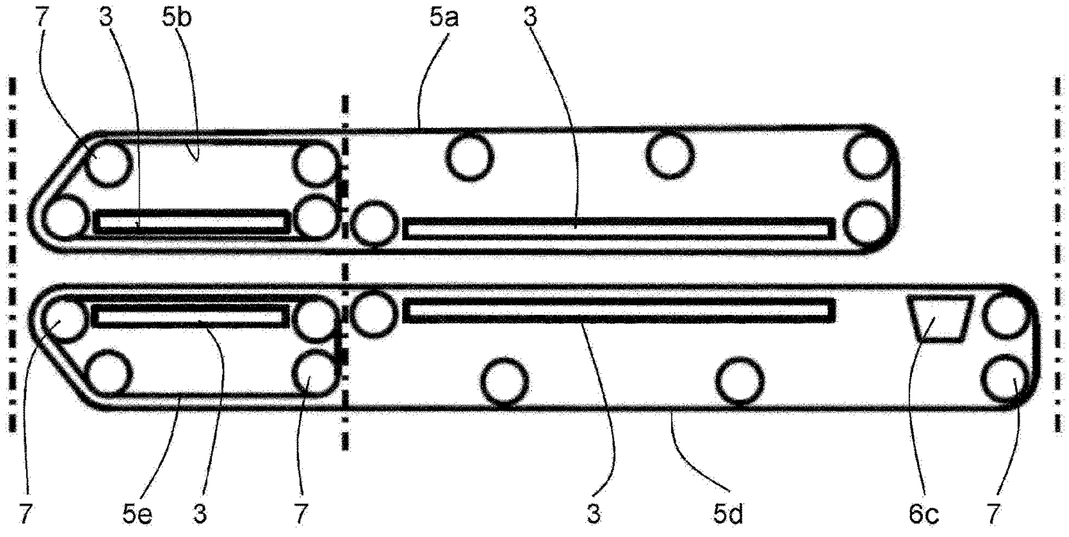
FIG. 2 is a schematic view of a second embodiment of the invention.
Figure 3:
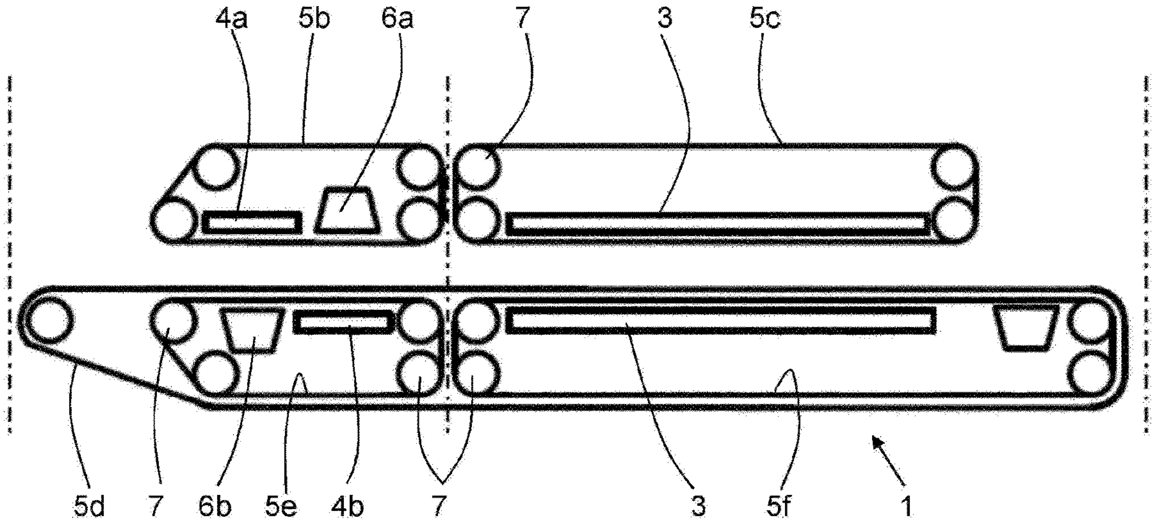
FIG. 3 is a schematic view of a third embodiment of the invention.
Figure 4:
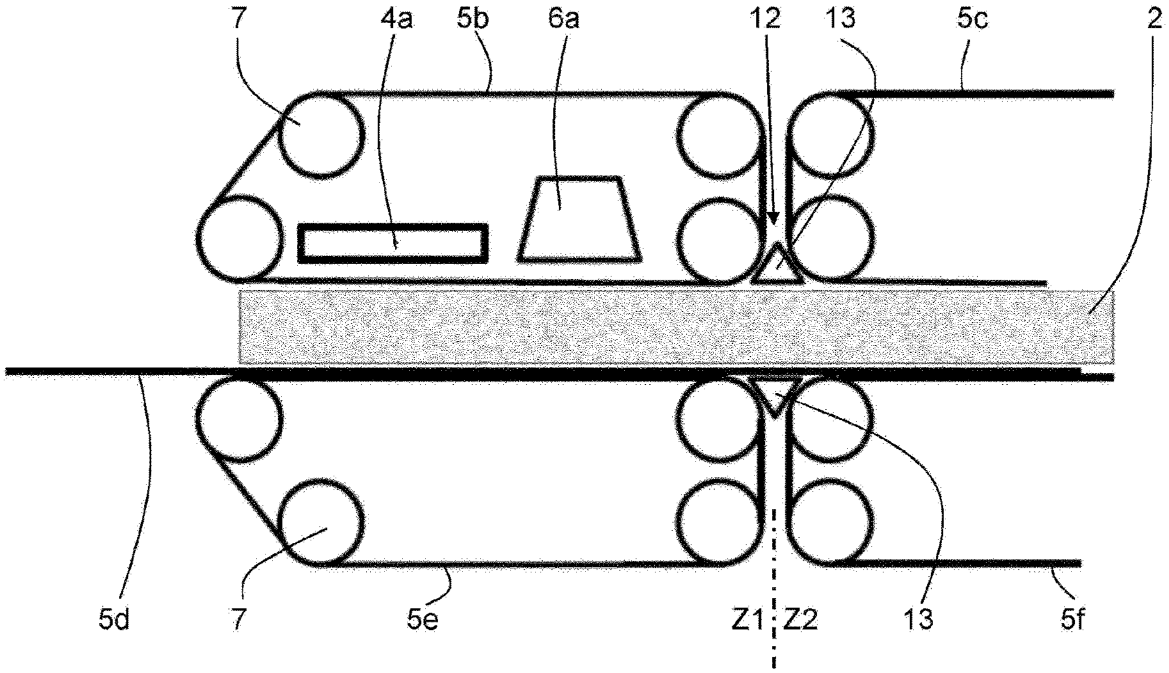
FIG. 4 is a schematic detail view showing a slide shoe between zones 1 and 2.

For clarity's sake, FIGS. 2 and 3 do not show details of the pressed-material mat and the driven deflection rollers and the intake opening. FIG. 2 differs from FIG. 1 as a possible second embodiment in that the rotating mesh belts 5*c* and 5*f* have been omitted. A possibility of this type consists in some types of insulating board, without major losses in the drive load being expected on the at least four endless driven deflection rollers.

FIG. 3 in turn shows, as a further embodiment, that the long endless mesh belt [5*a*] according to the invention can also be completely dispensed with. Therefore, only the mesh belts 5*b* and 5*c* are shown in the upper part of the apparatus.

Since, of course, a gap [12] is produced between the zones 1 and 2, even with the deflection rollers 7 of the mesh belts 5*b* and 5*c* closely juxtaposed, a slide shoe 13 extending over the full width of the pressed-material mat 2, provided in the gap 12 between two deflection rollers 7 of the two zones 1 and 2 and the pressed-material mat. As a result, the mat of pressed material here cannot expand in this less than 200 mm long gap and be damaged.

LIST OF REFERENCE CHARACTERS

1 apparatus
2 pressed-material mat
3 calibrating plate
4*a-c* steamer
5*a-f* mesh belt
6*a-c* suction device
7 deflection roller
8 driven roller
9 intake opening
10 height adjuster
11 air-cooling station
12 gap
13 slide shoe
14 cool air
Z1, Z2 zone

The invention claimed is:

1. An apparatus for making an insulating panel, the apparatus having:

upper and lower endless outer mesh belts having respective vertically confronting lower and upper reaches extending in a direction of treatment through both an upstream zone and a downstream zone for directly engaging and compressing a material mat and advancing the compressed-material mat in the direction through the zones;

upper and lower endless inner mesh belts inside the outer mesh belts in the upstream zone only and having respective lower and upper reaches juxtaposed with the respective lower and upper reaches of the respective outer mesh belts on the mat;

respective upper and lower drives including rollers each engaging a respective one of the mesh belts for advancing same;

means in the upstream zone inside the inner mesh belts in the upstream zone for injecting steam through the inner and outer mesh belts and into the mat; and calibration plates inside the outer mesh belts in the downstream zone.

2. The pparatus defined in claim 1, further comprising:

upper and lower endless inner mesh belts inside the outer mesh belts in the downstream zone and operatively engaging the mat through the respective upper and lower outer mesh belts, the calibration plates being inside the outer mesh belts of the downstream zone.

3. The apparatus according to claim 1, wherein each of the mesh belts has its own drive.

4. The apparatus according to claim 1, further comprising:

a blower for passing air through the downstream mesh belts and the pressed-material mat in the downstream zone for cooling the pressed-material mat.

5. The apparatus according to claim 1, further comprising:

a height-adjustable intake opening between the outer belts at an upstream end of the upstream zone.

6. The apparatus according to claim 5, further comprising:

a steam device in the intake opening.

7. The apparatus according to claim 1, wherein the calibration plates are heated.

8. The apparatus according to claim 1, wherein the upstream and the downstream zones are directly adjacent one another in the direction.

9. The apparatus according to claim 1, further comprising:

respective pluralities of deflection rollers over which the mesh belts are spanned; and a slide shoe bridging a gap in the direction between the deflection rollers of a lower one of the mesh belts in the upstream zone and an adjacent deflection roller of a lower one of the mesh belts in the downstream zone.

10. The apparatus according to claim 5, further comprising:

means for varying a size of the intake opening at upstream ends of the mesh belts in the upstream zone according to type of the incoming pressed-material mat to be treated.

11. The apparatus according to claim 8, further comprising:

means for guiding the pressed-material mat in a gap between two mesh-belt deflection rollers via a bridging slide shoe where the upstream and downstream zones are directly adjacent one another.

12. The apparatus defined in claim 1, further comprising:

upper and lower endless inner mesh belts inside the outer mesh belts in the downstream zone and operatively engaging the mat through the respective upper and lower outer mesh belts, the calibration plates being inside the outer mesh belts of the downstream zone.

* * * * *